UNITED STATES PATENT OFFICE.

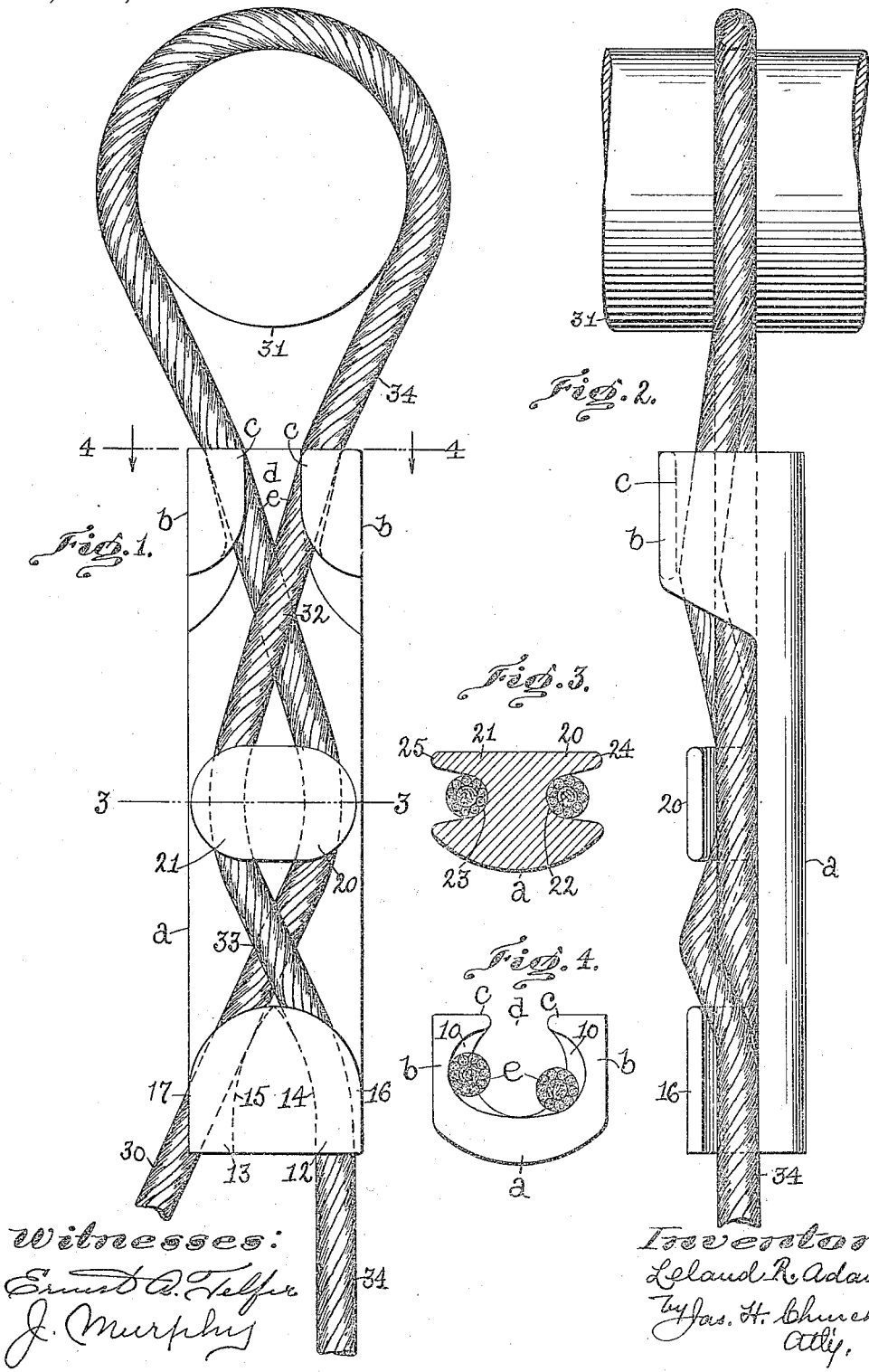

LELAND R. ADAMS, OF LYNN, MASSACHUSETTS.

HOLDING DEVICE FOR ROPES.

1,167,610.

Specification of Letters Patent.   Patented Jan. 11, 1916.

Application filed September 25, 1914.   Serial No. 863,547.

*To all whom it may concern:*

Be it known that I, LELAND R. ADAMS, a citizen of the United States, residing in Cliftondale, Lynn, in the county of Essex and State of Massachusetts, have invented an Improvement in Holding Devices for Ropes, of which the following description, in connection with the accompanying drawings, is a specification, like characters on the drawings representing like parts.

This invention relates to a holding device for ropes, wires and the like, and is especially adapted among other uses to be employed for anchoring guy and other wires employed in the overhead electric railway equipment, telephone, telegraph and like service.

The invention has for its object to provide a simple, inexpensive and highly efficient device for the purpose specified.

The particular features of the invention will be pointed out in the claims at the end of this specification.

Figure 1 represents in plan a holding device embodying this invention, with the wire cable or other rope in operative relation thereto. Fig. 2, a side elevation of the parts shown in Fig. 1. Fig. 3, a section on the line 3—3, Fig. 1. Fig. 4, a section on the line 4—4, Fig. 1.

In the present instance, I have shown a preferred form of holding device embodying this invention, which consists of a metal casting comprising a bar or body member $a$, having at one end side arms or lugs $b$ extended substantially at right angles to the body member $a$ and provided with end flanges $c$, which project toward each other but are separated to form a slot $d$ for the passage of the wire or rope $e$ between them. The side arms $b$ are preferably provided with curved inner surfaces 10, which converge from the outer ends of the said arms toward the inner ends thereof, to form a chamber or passage having converging side walls, for a purpose as will be described.

The body member $a$ is provided at its opposite end with spreading members 12, 13, herein shown as cast in one piece with the body member $a$, said spreading members being preferably provided with curved outer surfaces 14, 15, and with outwardly extended flanges 16, 17, which are substantially parallel with the body member $a$ and form grooves for the reception of the rope $e$.

The body member $a$ is further provided at a point between its ends with additional spreading members 20, 21, preferably cast in one piece with the body member $a$, and preferably having curved outer surfaces 22, 23, (see Fig. 3), and laterally extended flanges 24, 25, which are substantially parallel with the body member $a$ and form grooves for the reception of the rope $e$.

In operation with the device herein shown, the rope $e$ is engaged therewith, so that one portion or section of the rope crosses and rests upon another section, so that when strain is placed upon the upper portion or section of the rope, it will clamp the lower portion or section firmly to the body member or bar $a$.

The rope may be engaged with the device shown in Figs. 1 and 2 in the following manner. The free end 30 of the rope is first passed around the post or other anchoring device 31 and is then passed through the slot $d$, and laid in the groove 22 of the spreading member 20, and then in the groove 15 of the spreading member 13. The portion or section 34 of the rope in a slack condition is then passed through the slot $d$, and laid in the groove 23 of the spreading member 21 and in the groove 14 of the spreading member 12.

The end of the portion 34 of the rope is made fast, and one end of a block and tackle (not shown) is hitched to the portion 34 of the rope between the fastened end and the holding device, and the other end of said tackle is secured to the free end 30 of the rope $e$. Strain applied to the fall line brings the blocks together allowing section of rope 34 to become slack, this slack moving through spreading members around post 31, through spreading members until the strain of sections 30, 34, of rope are equal, and the block and tackle may then be removed and clamp will automatically hold. The rope does not need to be drawn to full tension or balance to hold. In this manner, the underlying portion of the rope is clamped in such firm engagement with the body portion $a$, as to prevent slipping, and the rope is thus secured in fixed relation to the holding device, without the necessity of tying the free end of the rope, which enables the rope to be secured at one end in a substantially short time.

The converging surfaces 10 of the arm $b$ serve to direct the rope to the intermediate spreading members 20, 21, so as to cause the upper or top portion of the rope to cross the lower portion at a point substantially central with relation to the spreading members 20, 21 and the side arms *b*, and the inner surfaces 14, 15, of the spreading members 12, 13, also converge to cause the upper portion of the rope to cross the lower at a point substantially central with relation to the spreading members 12, 13, and 20, 21.

It is preferred to make the spreading member 12 integral with the spreading member 13, and the member 20 integral with the member 21, but it is not desired to limit the invention in this respect.

Claims:

1. A holding device of the character described, comprising a body member provided at one end with spreading members and at its opposite end with side arms having flanges extended toward each other to form a slot, and having between said parts spreading members, substantially as described.

2. A holding device of the character described, comprising a body member provided with spreading members and with side arms having flanges extended toward each other to form a slot, substantially as described.

In testimony whereof, I have signed my name to this specification in the presence of two subscribing witnesses.

LELAND R. ADAMS.

Witnesses:
 JAS. H. CHURCHILL,
 J. MURPHY.

Copies of this patent may be obtained for five cents each, by addressing the "Commissioner of Patents, Washington, D. C."